(12) United States Patent
Song et al.

(10) Patent No.: US 8,989,033 B2
(45) Date of Patent: Mar. 24, 2015

(54) DOWNLINK MCS SELECTION IN A TYPE 2 RELAY NETWORK

(75) Inventors: Yi Song, Plano, TX (US); Zhijun Cai, Euless, TX (US); Yi Yu, Irving, TX (US); Rose Qingyang Hu, Allen, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 114 days.

(21) Appl. No.: 13/505,241

(22) PCT Filed: Oct. 29, 2010

(86) PCT No.: PCT/US2010/054858
§ 371 (c)(1),
(2), (4) Date: May 30, 2012

(87) PCT Pub. No.: WO2011/053865
PCT Pub. Date: May 5, 2011

(65) Prior Publication Data
US 2012/0243430 A1    Sep. 27, 2012

Related U.S. Application Data

(60) Provisional application No. 61/256,730, filed on Oct. 30, 2009.

(51) Int. Cl.
*H04L 27/00* (2006.01)
*H04L 1/00* (2006.01)
*H04L 1/18* (2006.01)

(52) U.S. Cl.
CPC ............... *H04L 1/0015* (2013.01); *H04L 1/18* (2013.01); *H04L 1/0035* (2013.01); *H04L 1/0009* (2013.01); *H04L 1/0003* (2013.01); *H04L 2001/0097* (2013.01); *H04L 1/0026* (2013.01)
USPC .......................................... 370/252

(58) Field of Classification Search
CPC ............... H04L 47/10; H04L 43/50
USPC ........... 370/252, 328, 474; 375/211
See application file for complete search history.

(56) References Cited

U.S. PATENT DOCUMENTS 7,120,199 B2 * 10/2006 Thielecke et al. ............ 375/267
7,184,497 B2 *  2/2007 Jeske et al. .................... 375/346
8,345,787 B2 *  1/2013 Yu et al. ........................ 375/267

(Continued)

FOREIGN PATENT DOCUMENTS

CN     101278584 A     10/2008

OTHER PUBLICATIONS

TSGR1#18(01)0082.*

(Continued)

*Primary Examiner* — Mark Rinehart
*Assistant Examiner* — Peter Solinsky
(74) *Attorney, Agent, or Firm* — Conley Rose, P.C.; J. Robert Brown, Jr.

(57) ABSTRACT

A method for selecting an MCS for a cell in which one or more Type 2 relay nodes are present. The method includes the access node for the cell estimating the quality of the link between a relay node in the cell and a UA in the cell and using the estimate to select an MCS for the cell.

18 Claims, 11 Drawing Sheets

(56) References Cited

U.S. PATENT DOCUMENTS

| | | | |
|---|---|---|---|
| 8,363,624 B2 * | 1/2013 | Blanz et al. | 370/335 |
| 8,437,268 B2 * | 5/2013 | Cai et al. | 370/252 |
| 8,451,928 B2 * | 5/2013 | Agee et al. | 375/267 |
| 8,514,957 B2 * | 8/2013 | Nammi et al. | 375/260 |
| 8,515,443 B2 * | 8/2013 | Kim et al. | 455/452.2 |
| 2004/0266451 A1 * | 12/2004 | Stolyar et al. | 455/452.2 |
| 2005/0286440 A1 * | 12/2005 | Strutt et al. | 370/253 |
| 2006/0245509 A1 * | 11/2006 | Khan et al. | 375/260 |
| 2007/0184853 A1 * | 8/2007 | Hottinen et al. | 455/456.1 |
| 2007/0201400 A1 | 8/2007 | Kang et al. | |
| 2008/0200202 A1 * | 8/2008 | Montojo et al. | 455/522 |
| 2009/0042596 A1 * | 2/2009 | Yavuz et al. | 455/522 |
| 2009/0247181 A1 * | 10/2009 | Palanki et al. | 455/452.2 |
| 2010/0080176 A1 * | 4/2010 | Maas et al. | 370/329 |
| 2010/0103835 A1 * | 4/2010 | Sung et al. | 370/252 |
| 2011/0019559 A1 * | 1/2011 | Gore et al. | 370/252 |
| 2011/0122920 A1 * | 5/2011 | Filipiak et al. | 375/130 |
| 2011/0243283 A1 * | 10/2011 | Wang et al. | 375/346 |
| 2011/0305154 A1 * | 12/2011 | Forck et al. | 370/252 |
| 2012/0087271 A1 * | 4/2012 | Blanz et al. | 370/252 |
| 2012/0182899 A1 * | 7/2012 | Mujtaba et al. | 370/252 |
| 2012/0300738 A1 * | 11/2012 | Palanki et al. | 370/329 |
| 2013/0010893 A1 * | 1/2013 | Maddah-Ali et al. | 375/296 |
| 2013/0034130 A1 * | 2/2013 | Forenza et al. | 375/219 |
| 2013/0035132 A1 * | 2/2013 | Shin et al. | 455/522 |
| 2013/0039310 A1 * | 2/2013 | Hsu et al. | 370/329 |
| 2013/0064122 A1 * | 3/2013 | Hammarwall et al. | 370/253 |
| 2013/0095748 A1 * | 4/2013 | Hu et al. | 455/8 |
| 2013/0122948 A1 * | 5/2013 | Jia et al. | 455/501 |

OTHER PUBLICATIONS

ETSI TS 36.213 Ver. 8.8.0 Release 8, Oct. 2009, 8.2 UE Sounding procedure.*

PCT International Search Report; Application No. PCT/US2010/054858; Apr. 18, 2011; 3 pages.

PCT Written Opinion of the International Searching Authority; Application No. PCT/US2010/054858; Apr. 18, 2011; 5 pages.

PCT Written Opinion of the International Preliminary Examining Authority; Application No. PCT/US2010/054858; Oct. 6, 2011; 7 pages.

PCT International Preliminary Report on Patentability; Application No. PCT/US2010/054858; Dec. 27, 2011; 17 pages.

TSG-RAN WG1 #57bis; "Measurement of Access Downlink of Type II Relay"; R1-092471; Los Angeles, USA; Jun. 29-Jul. 3, 2009; 4 pages.

3GPP TSG RAN WG1 #57; "System Design Frameworks to Support Type II Relay Operation in LTE-A"; R1-092157; San Francisco, CA; May 4-8, 2009; 11 pages.

3GPP TSG-RAN WG1 #58; "Challenges with Type II Relay Operation"; R1-093113; Shenzhen, China; Aug. 24-28, 2009; 3 pages.

3GPP TSG-RAN WG1 #58; "Text Proposal for Channel Model and Evaluation Methodology"; R1-093726; Shenzhen, China; Aug. 24-28, 2009; 7 pages.

Chinese Office Action as Received in Co-pending Application No. 201080060094.1 Apr. 17, 2014; 5 pages. (No English translation available).

* cited by examiner

FIG. 11A

TABLE 1 SIMULATION PARAMETERS

| PARAMETER | ASSUMPTION/VALUE |
|---|---|
| CELLULAR LAYOUT | HEXAGONAL GRID, 19 MACRO eNB, THREE SECTORS PER CELL, WRAPPED-AROUND |
| RELAY LAYOUT | FOUR RNs PER SECTOR UNIFORMLY DISTRIBUTED AT 2/3 OF CELL RADIUS |
| INTER-SITE DISTANCE (ISD) | 1732 m (CASE 3) |
| DISTANCE-DEPENDENT PATH LOSS FOR eNB → UE | $PL_{LOS}(R)=103.4+24.2\log10(R)$<br>$PL_{NLOS}(R)=131.1+42.8\log10(R)$, R IN km.<br>CASE 1: $PROB(R)=MIN(0.018/R,1)*(1-\exp(-R/0.063))+\exp(-R/0.063)$<br>CASE 3: $PROB(R)=\exp(-(R-0.01)/1.0)$ |
| DISTANCE-DEPENDENT PATH LOSS FOR RN → UE | $PL_{LOS}(R)=103.8+20.9\log10(R)$<br>$PL_{NLOS}(R)=145.4+37.5\log10(R)$, R IN km.<br>CASE 1: $PROB(R)=0.5-MIN(0.5,5\exp(-0.156/R))+\min(0.5, 5\exp(-R/0.03))$<br>CASE 3: $PROB(R)=0.5-MIN(0.5,3\exp(-0.3/R))+\min(0.5, 3\exp(-R/0.095))$ |
| SHADOWING STANDARD DEVIATION | 10dB (RN TO UE); 8dB (eNB TO UE) |
| SHADOWING CORRELATION | 0.5 BETWEEN SITES (INCLUDING eNB AND RN); 1 BETWEEN SECTORS PER SITE |
| PENETRATION LOSS | 20dB FROM eNB TO UE, 20dB FROM RN TO UE |
| ANTENNA PATTERN FOR MACRO eNBs TO UEs (HORIZONTAL) | $A(\theta)=-\min\left[12\left(\frac{\theta_{eth}}{\theta_{3dB}}\right)^2, A_m\right]$<br>$\theta_{3dB}$ = 70 DEGREES, $A_m$ = 25dB<br>(70 DEGREE HORIZONTAL BEAMWIDTH) |
| ANTENNA PATTERN FOR MACRO eNBs TO UEs (VERTICAL) | $A(\theta)=-\min\left[12\left(\frac{\theta-\theta}{\theta_{3dB}}\right)^2, SLA_v\right]$<br>$\theta_{3dB}$ = 10 DEGREES, $SLA_v$ = 20dB,<br>ANTENNA DOWNTILT 6 DEGREES FOR CASE 3 |
| COMBINING METHOD IN 3D ANTENNA PATTERN | $A(\varphi,\theta)=-\min\{-[A_H(\varphi)+A_v(\theta)], A_m\}$ |
| ANTENNA PATTERN FOR RELAYS TO UEs | OMNI-DIRECTIONAL |
| CARRIER FREQUENCY | 2GHz |

TO FIG. 11B

FROM FIG. 11A

| BANDWIDTH | 10MHz |
|---|---|
| MINIMUM DISTANCE BETWEEN UE AND eNB/RN | 35m BETWEEN UE AND eNB, 10m BETWEEN UE AND RN |
| TX POWER | 46dBm FOR eNB, 30dBm FOR RN |
| BS ANTENNA GAIN (INCLUDING CABLE LOSS) | 14dBi |
| RELAY ANTENNA GAIN (INCLUDING CABLE LOSS) | 5dBi |
| UE ANTENNA GAIN | 0dBi |
| UE NOISE FIGURE | 9dB |
| eNB NOISE FIGURE | 5dB |
| ANTENNA CONFIGURATION | 1x2 FOR eNB-UE, 1x2 FOR RN-UE |
| MOBILE SPEED | 3km/h |
| FAST FADING | ETU, INDEPENDENT FADING FOR TWO ANTENNA BRANCHES |
| SCHEDULER | ROUND-ROBIN WITH FULL BANDWIDTH ALLOCATION |
| CQI FEEDBACK | FEEDBACK PERIOD 5msec, FEEDBACK DELAY 6msec |
| CHANNEL ESTIMATION | IDEAL |
| CONTROL CHANNEL OVERHEAD | 3 OFDM SYMBOLS |
| HARQ COMBINING | CHASE |
| NUMBER OF USERS | TEN USERS PER SECTOR |
| RELAY COORDINATED TRANSMISSION | INITIAL TRANSMISSION FROM eNB ONLY, RETRANSMISSION FROM eNB AND RN |
| BACKHAUL | PERFECT BACKHAUL, NO PACKET ERROR ON eNB-RN LINK |
| TRAFFIC TYPE | FULL BUFFER |

FIG. 11B

| | DISCLOSED METHOD | OTHER METHOD |
|---|---|---|
| GAIN ON SECTOR THROUGHPUT | 2.61% | 1.68% |
| GAIN ON CELL-EDGE THROUGHPUT | 15.3% | 8.0% |

DOWNLINK MCS SELECTION IN A TYPE 2 RELAY NETWORK

CROSS REFERENCE

This application is a filing under 35 U.S.C. 371 of International Application No. PCT/US2010/054858 filed Oct. 29, 2010, entitled "Downlink MCS Selection in a Type 2 Relay Network" claiming priority to U.S. Provisional Application No. 61/256,730 filed on Oct. 30, 2009, entitled "Downlink MCS Selection in a Type 2 Relay Network", which are incorporated by reference herein as if reproduced in their entirety.

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long Term Evolution (LTE) and LTE-Advanced (LTE-A). For example, an LTE or LTE-A system might include an Evolved Universal Terrestrial Radio Access Network (E-UTRAN) or evolved node B (eNB), a wireless access point, or a similar component rather than a traditional base station. As used herein, the term "access node" will refer to any component of the wireless network, such as a traditional base station, a wireless access point, or an LTE or LTE-A eNB, that creates a geographical area of reception and transmission coverage allowing a UA or a relay node to access other components in a telecommunications system. An access node may comprise a plurality of hardware and software.

The term "access node" may not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may be used serially to extend or enhance coverage created by an access node.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 11 is a table including a listing of parameters for simulations based on one or more embodiments of the present disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
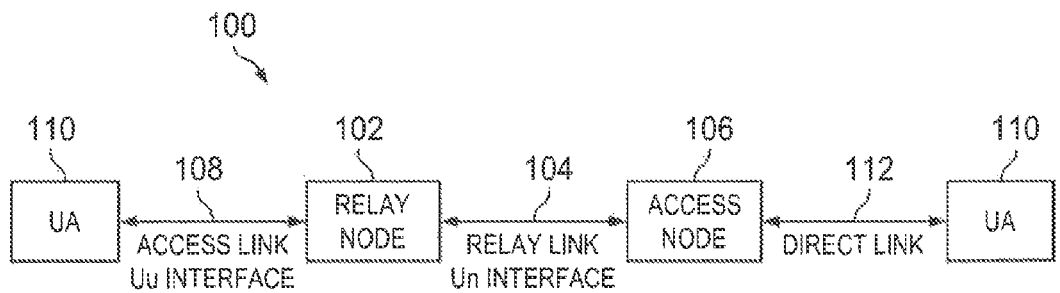
FIG. 1 is a diagram illustrating a wireless communication system that includes a relay node, according to an embodiment of the disclosure.

FIG. 1 is a diagram illustrating a wireless communication system 100 that includes a relay node 102, according to an embodiment of the disclosure. Examples of the wireless communication system 100 include LTE or LTE-A networks, and all of the disclosed and claimed embodiments could be implemented in an LTE-A network. The relay node 102 can receive and amplify a signal received from a UA 110 and transmit the signal to an access node 106. In some implementations of a relay node 102, the relay node 102 receives a signal with data from the UA 110 and then generates a new signal to transmit the data to the access node 106. The relay node 102 can also receive data from the access node 106 and deliver the data to the UA 110.

The relay node 102 might be placed near the edges of a cell so that the UA 110 can communicate with the relay node 102 rather than communicating directly with the access node 106 for that cell. In radio systems, a cell is a geographical area of reception and transmission coverage. Cells can overlap with each other. In the typical example, there is one access node associated with each cell. The size of a cell is determined by factors such as frequency band, power level, and channel conditions. Relay nodes, such as relay node 102, can be used to enhance coverage within a cell or to extend the size of coverage of a cell. Additionally, the use of a relay node 102 can enhance throughput of a signal within a cell because the UA 110 can access the relay node 102 at a higher data rate than the UA 110 might obtain when communicating directly with the access node 106 for that cell, thus creating higher spectral efficiency. The use of a relay node 102 can also decrease the UA's battery usage by allowing the UA 110 to transmit at a lower power.

Relay nodes can be divided into three kinds: layer one relay nodes, layer two relay nodes, and layer three relay nodes. A layer one relay node is essentially a repeater that can retransmit a transmission without any modification other than amplification and slight delay. A layer two relay node can demodulate/decode a transmission that it receives, re-encode/modulate the demodulated/decoded data, and then transmit the re-encoded/modulated data. A layer three relay node can have full radio resource control capabilities and can thus function similarly to an access node.

The radio resource control protocols used by a relay node may be the same as those used by an access node, and the relay node may have a unique cell identity typically used by an access node. Relay nodes known as Type 1 relay nodes have their own physical cell IDs and transmit their own synchronization signals and reference symbols. Relay nodes known as Type 2 relay nodes do not have separate cell IDs and thus would not create any new cells. That is, a Type 2 relay node does not transmit a physical ID that is different from the access node ID. A type 2 relay node should be able to relay to and from legacy (LTE Release 8) UAs and legacy UAs should not be aware of the presence of a Type 2 relay node. In some cases, the embodiments described herein may preferably be implemented in Type 2 relay nodes.

When the UA 110 is communicating with the access node 106 via the relay node 102, the links that allow wireless communication can be said to be of three distinct types. The communication link between the UA 110 and the relay node 102 is said to occur over an access link 108, which can also be referred to as the Uu interface. The communication between the relay node 102 and the access node 106 is said to occur over a relay link 104, which can also be referred to as the Un interface. Communication that passes directly between the UA 110 and the access node 106 without passing through the relay node 102 is said to occur over a direct link 112.

For a cell in which no relay nodes are present, several techniques are known for selecting an appropriate modulation and coding scheme (MCS) for transmissions in the cell. For a cell in which one or more Type 2 relay nodes are present, MCS selection can be challenging because Type 2 relay nodes do not transmit cell-specific reference signals. Therefore, the access node for such a cell must choose an MCS without complete knowledge of the quality of the link between the relay node and the UA.

Embodiments of the present disclosure provide techniques for an access node to select an MCS for a cell in which one or more Type 2 relay nodes are present. To do so, the access node 106 might first estimate, in one of several different ways, the quality of the link between the relay node 102 and the UA 110. The access node 106 can then use this estimate in one of several different ways to select an MCS for the cell. The selection can take into account, among other possible factors, the quality of the link between the access node 106 and the relay node 102, whether a single relay node 102 or multiple relay nodes are present, and whether voice over internet protocol (VoIP) service is in use in the cell. To improve the quality of the MCS selection, an outer loop link adaptation procedure could be applied, wherein the MCS is adjusted based on the observed error rate statistics and retransmission statistics.

Figure 2:
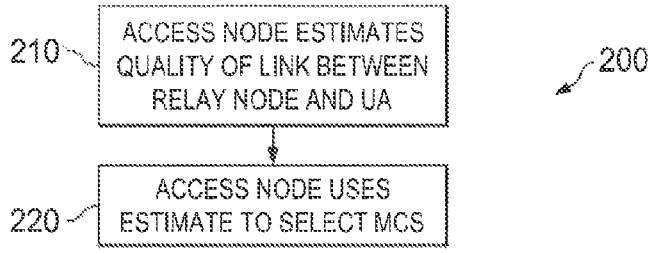
FIG. 2 is a block diagram of a method for selecting an MCS for a cell in which one or more Type 2 relay nodes are present, according to an embodiment of the disclosure.

FIG. 2 illustrates an embodiment of a method 200 for selecting an MCS for a cell in which one or more Type 2 relay nodes are present. At block 210, the access node for the cell estimates the quality of the link between the relay node and the UA. At block 220, the access node uses the estimate to select an MCS for the cell.

Figure 3:
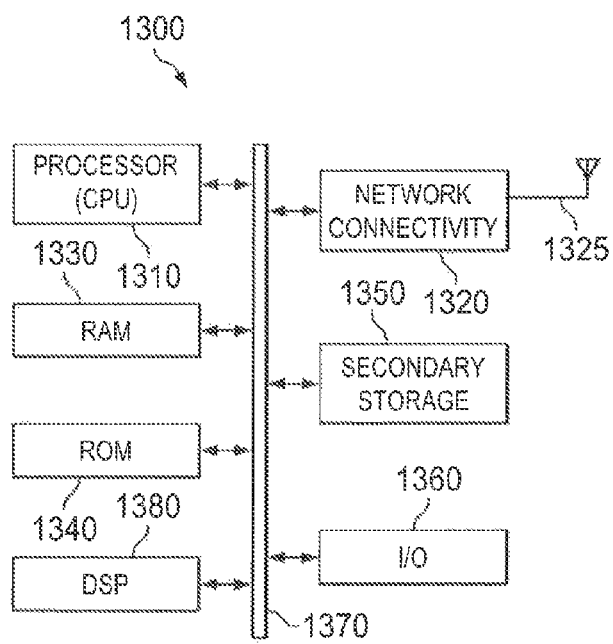
FIG. 3 illustrates a processor and related components suitable for implementing the several embodiments of the present disclosure.

The UA 110, the relay node 102, the access node 106, and other components described herein might include a processing component that is capable of executing instructions related to the actions described throughout the present disclosure. FIG. 3 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320. Various components of the system 1300 may be referred to herein, either alone or in combination, as "component" or "components".

In an embodiment, a method is provided for selecting an MCS for a cell in which one or more Type 2 relay nodes are present. The method comprises the access node for the cell estimating the quality of the link between a relay node in the cell and a UA in the cell and using the estimate to select an MCS for the cell.

The following are incorporated herein by reference for all purposes: 3rd Generation Partnership Project (3GPP) Technical Report (TR) 36.814; Draft Report of 3GPP TSG Radio Access Network (RAN) WG1 #58; R1-093113, "Challenges with Type II Relay Operation," Qualcomm, #58; R1-093726, "Text Proposal for Channel Model and Evaluation Methodology." CMCC, #58.

As discussed in further detail below, the present disclosure provides various techniques for estimating the quality of a link between a relay node and UA. For instance, the present disclosure proposes techniques for selecting a MCS for both, perfect backhaul links and imperfect backhaul links (e.g., a channel linking an access node to a relay node). Moreover, the present disclosure provides techniques for selecting appropriate modulation and selection schemes according to various embodiments. However, it is to be understood that the techniques of the present disclosure are not limited to the specific examples discussed herein, as those of skill in the art will appreciate that they may be employed and/or modified for use with any suitable application without departing from the scope of the present disclosure.

In practice, the placement of a relay node may be optimized to achieve a suitable backhaul link quality. Generally, perfect backhaul implies an excellent backhaul link so that the highest MCS level may be supported and a relay node may decode a packet after one transmission. Imperfect backhaul, on the other hand, generally implies that a backhaul cannot always support the highest MCS level. In the case of what is known as a perfect backhaul, the link qualities of a direct link (e.g., a channel linking an access node to a UA) and an access link (e.g., a channel linking a relay node to a UA) may be used to select a MCS level. For what is known as an imperfect backhaul link, the qualities of a direct link, an access link, and a relay link (e.g., a channel linking a relay node to an access node) may be considered collectively, and a MCS level that the backhaul link can support may be chosen as well. For an access node to know the link quality of a relay link, the corresponding relay node may communicate information such as, but not limited to, a pre-coding matrix index (PMI), rank indicator (RI), channel quality indicator (CQI), or combinations thereof, to the access node 106.

Estimation of RN-UA Link Quality

As previously discussed, an access node 106 might estimate the quality of a link between the relay node 102 and the UA 110 in various ways. For instance, the access node 106 may obtain information regarding the coupling loss (i.e., large-scale signal attenuation without fast fading) differences between the direct link 112 communications and the access link 108 communications. The access node 106 may obtain such information by way of an uplink sounding reference symbol (SRS) transmission, uplink transmissions such as a physical uplink shared channel (PUSCH) transmissions and random access preamble transmissions, or according to any other suitable manner. In one aspect, the relay node 102 may forward the signal strength of SRS transmissions or other uplink transmissions to the access node 106. In turn, the access node 106 may compare the signal strength received from the relay node 102 with the signal strength received at the access node in order to estimate the coupling loss differences between the direct link 112 and the access link 108.

In an another example, the access node 106 may estimate the signal to interference-and-noise ratio (SINR) of the communications between the access node 106 and UA 110 on the direct link 112 using information received from the relay node 102. For instance, the relay node 102 may provide information such as, but not limited to, a pre-coding matrix index (PMI), rank indicator (RI), channel quality indicator (CQI), or combinations thereof, to the access node 106 via the relay link 104. Thus, the access node 106 may use a received CQI to estimate the SINR of the direct link 112 by way of a mapping table of CQI to SINR. For instance, the SINR value in the mapping table may be the required SINR to support a MCS corresponding to the CQI. For an LTE and/or LTE-A system, the SINR value in the mapping table may be the lowest SINR required to support a MCS achieving a 10% frame error rate (FER) after a first transmission. Alternatively, the SINR value in the mapping table may be the medium or average value of SINRs that can support a MCS achieving a 10% FER after the first transmission.

In yet another example, the access node 106 may estimate the SINR of the communications between the relay node 102 and UA 110 on the access link 108. For instance, the access node 106 may scale the estimated SINR of the direct link 112 by the coupling loss difference and the transmit power difference between the access node 106 and relay node 102. Moreover, if a different number of antennas are employed at the access node 106 and relay node 102 for transmission, the access node may also scale the estimated SINR of the access link 108 based on the difference of the antenna diversity gain.

In a time division duplex (TDD) system, due to the reciprocity of uplink/downlink channels, the access node 106 can obtain a better estimate of the quality of the access link 108 in terms of capturing the fast fading on the access link 108. For instance, the relay node 102 may measure the uplink SRS transmission from the UA 110 and report the measurement to the access node 106 via the relay link 104. The access node 106 may then compare the received SRS signal strengths at the relay node 102 and access node 106 in order to determine the ratio of the two SRS signal strengths. This ratio represents the signal attenuation difference between the direct link 112 and the access link 108 with the effect of fast fading. The access node 106 may also estimate the SINR of the access link 108 by scaling the SINR of the direct link 112 by the foregoing ratio and the transmit power difference of the access node 106 and relay node 102.

Perfect Backhaul Link

Figure 4:
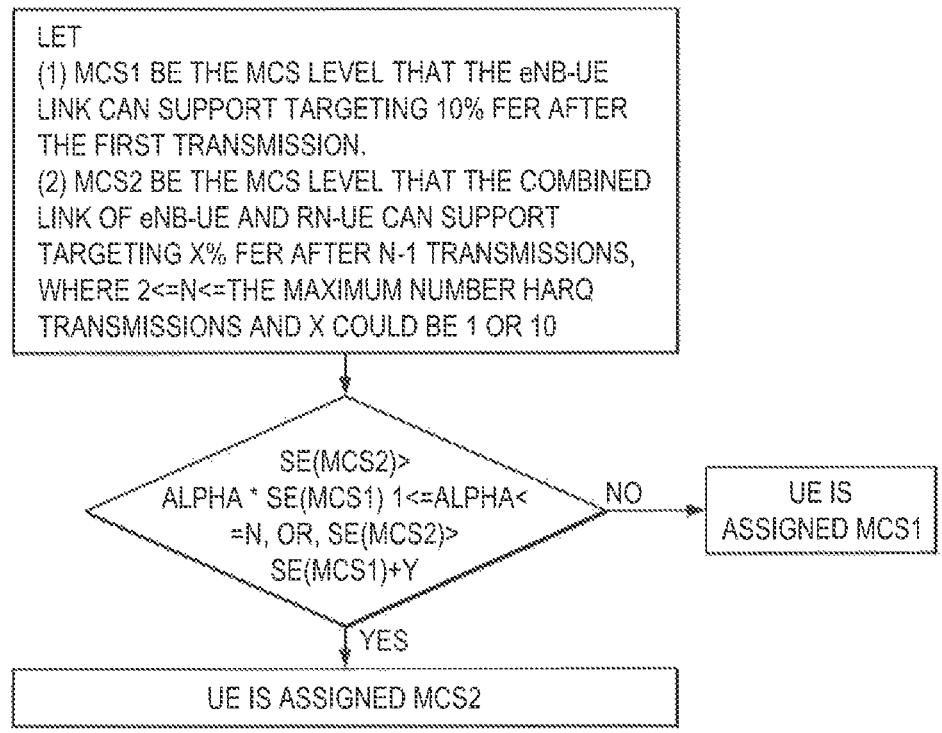
FIGS. 4-10 include flow charts depicting methods of selecting an appropriate modulation and coding scheme (MCS) according to various embodiments of the present disclosure.

Referring now to FIG. 4, a flow chart is shown illustrating a method according to an embodiment of the present disclosure for selecting a MSC in a perfect backhaul link. Using the SINR estimates for the direct link (eNB-UA) and access link (RN-UA) at the access node (eNB), an algorithm according to this embodiment may be employed to choose an appropriate MCS level if one relay node (RN) participates in a coordinated transmission. First, the algorithm may assume that MCS1 is the MCS level that the direct link (eNB-UA) can support targeting 10% FER after the first transmission. Second, the algorithm may assume that MCS2 is the MCS level that the combination of the direct link (eNB-UA) and access link (RN-UA) can support targeting X % FER after N−1 transmissions, where $2 \leq N \leq$ the maximum number of hybrid automatic repeat request (HARQ) transmissions, and where X may be 1 or 10. Typically, for example, N=2 may be used.

If the spectral efficiency (SE) of MCS2, SE(MCS2), is larger than alpha times of the spectral efficiency of MCS1, SE(MSC1), where $1 \leq alpha \leq N$, or if SE(MCS2) is larger than SE(MCS1)+Y, the UA may be assigned MCS2. Otherwise, the UA may be assigned MCS1. Alpha or Y may be adjusted in the outer loop link adaptation as described in further detail below. Further, it is to be understood that if multiple relay nodes (RNs) participate in the coordinated transmissions, the algorithm described above and shown in FIG. 4 may still apply, with MCS2 being the MCS level based on the link quality of the combined link of eNB-UA and multiple RNs-UA (e.g., the combination of a direct link and multiple access links).

Imperfect Backhaul Link

Figure 5:
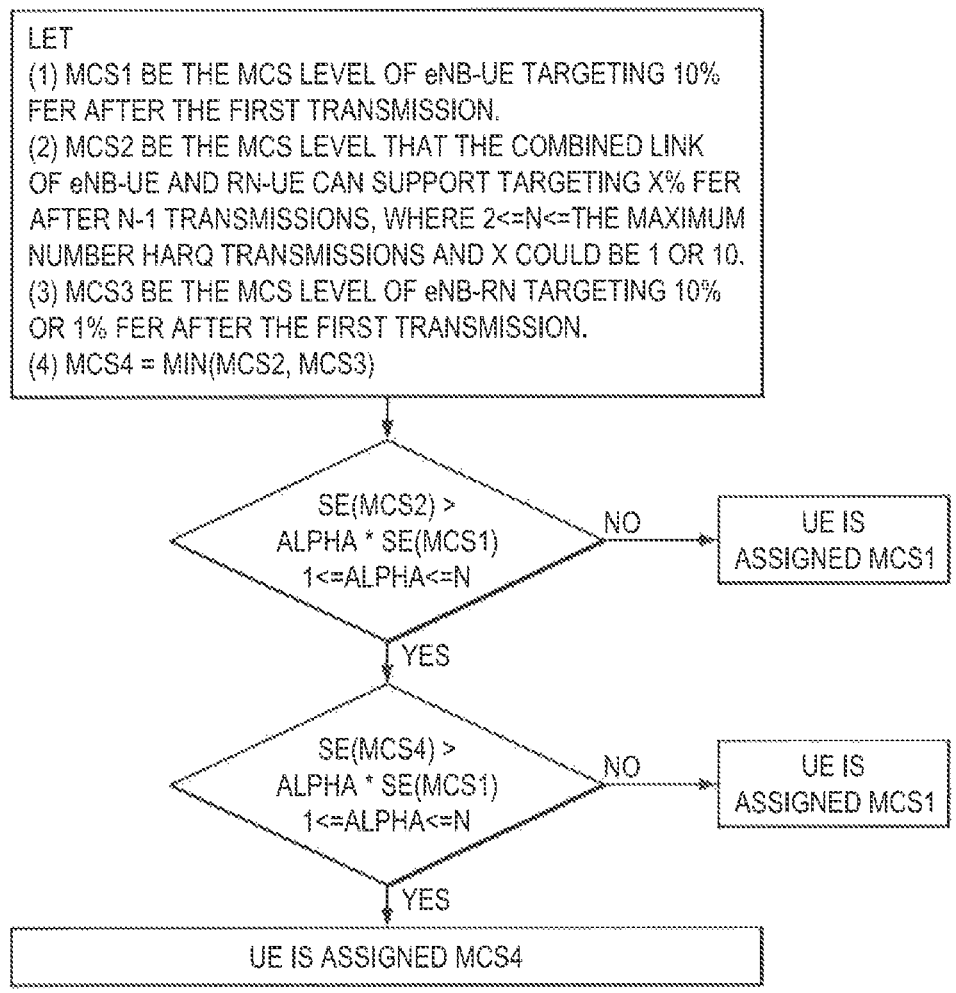

Referring now to FIG. 5, a flow chart is shown illustrating a method according to an embodiment of the present disclosure for selecting a MSC in an imperfect backhaul link. In the case of an imperfect backhaul link, a MCS level may be chosen that can be supported by a backhaul link. Using the SINR estimates for the direct (eNB-UA) and access (RN-UA) links at the access node (eNB), an algorithm according to this embodiment may be employed to choose an appropriate MCS level if one relay node (RN) participates in the coordinated transmission. First, the algorithm may assume that MCS1 is the MCS level that the direct (eNB-UEUA) link can support targeting 10% FER after the first transmission. Second, the algorithm may assume that MCS2 is the MCS level that the combination of the direct link and access link (e.g., combined link of eNB-UA and RN-UA) can support targeting X % FER after N−1 transmissions, where $2 \leq N \leq$ the maximum number of HARQ transmissions, and where X may be 1 or 10. Typically, for example, N=2 may be used. Third, the algorithm may assume that MCS3 is the MCS level based on the quality of the relay link (eNB-RN) targeting 1% or 10% FER after the first transmission. Targeting 1% may give a more conservation MCS selection to ensure that the relay node (RN) can decode the packet reliably after the initial transmission.

If the spectral efficiency (SE) of MCS2 is smaller than alpha times of the spectral efficiency of MCS1, where $1 \leq alpha \leq N$, or if SE(MCS2) is smaller than SE(MCS1)+Y, the UA may be assigned MCS1. As described in further detail below, alpha or Y may be adjusted in the outer loop link adaptation. If the spectral efficiency of MCS2 is larger than alpha times the spectral efficiency of MCS1, or if SE(MCS2) is larger than SE(MCS1)+Y, MCS4 may be min(MCS2, MCS3). If the spectral efficiency of MCS4 is larger than alpha times the spectral efficiency of MCS1, or if SE(MCS4) is larger than SE(MCS1)+Y, the UA may be assigned MCS4. Otherwise, the UA may be assigned MCS1.

Multiple-RN with Imperfect Backhauls

Figure 6:
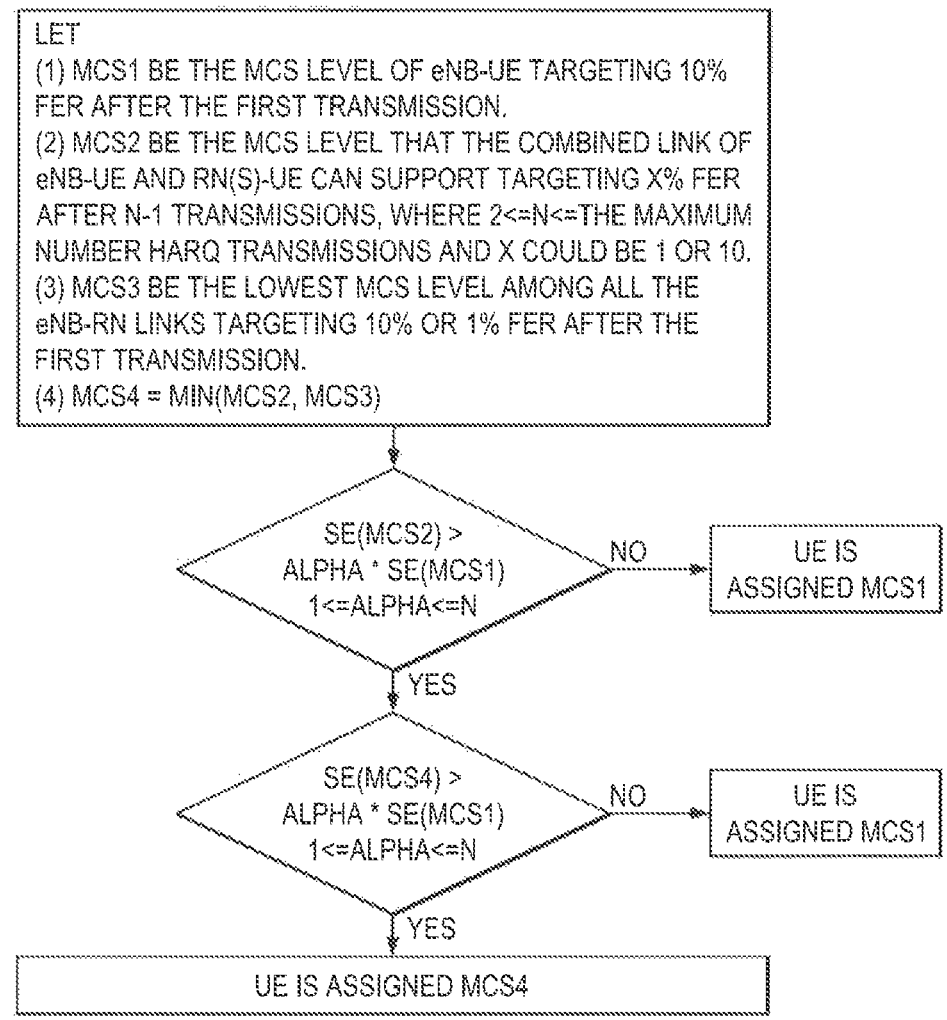

Referring now to FIG. 6, a flow chart is shown illustrating a method according to an embodiment of the present disclosure for selecting a MSC with imperfect backhaul links in which a UA is assigned to multiple relay nodes. If a UEUA is assigned to multiple RNs, all relay nodes may not need to be involved in the coordinated transmissions. For instance, if a backhaul link from the access node to a certain relay node is not suitable, that relay node may not be involved in the coordinated transmission. In a case where a UA is assigned to multiple relay nodes, an algorithm according to this embodiment may be employed to choose an appropriate MCS.

The algorithm may first determine all of the possible sets of nodes that may participate in the coordinated transmission. For example, a UA may be assigned to a first relay node (RN1), a second relay node (RN2), and a third relay node (RN3). In such a case, the algorithm may determine that there are seven possible sets of nodes participating the coordinated transmission: {eNB, RN1}, {eNB, RN2}, {eNB, RN3}, {eNB, RN1, RN2}, {eNB, RN1, RN3}, {eNB, RN2, RN3}, and {eNB, RN1, RN2, RN3}. For each set, the algorithm depicted in FIG. 6 may be used to determine a MCS level, and in turn, select the highest MCS level and the associated set for the UA transmission.

As shown in FIG. 6, the algorithm may first assume that MCS1 is the MCS level that the direct link (eNB-UA) can support targeting 10% FER after the first transmission. Next, the algorithm may assume that MCS2 is the MCS level that the combination of the direct link (eNB-UA) and one or more access links (RN(s)-UA) can support targeting X % FER after N−1 transmissions, where $2 \leq N \leq$ the maximum number of HARQ transmissions, and where X may be 1 or 10. Typically, for example, N=2 may be used. The algorithm may further assume that MCS3 is the lowest MCS level among all of the relay links (eNB-RN) targeting 1% or 10% FER after the first transmission.

If the spectral efficiency of MCS2 is smaller than alpha times the spectral efficiency of MCS1, where $1 \leq alpha \leq N$, the UA may be assigned MCS1. As described in greater detail below, alpha may be adjusted in the outer loop link adaptation. If the spectral efficiency of MCS2 is larger than alpha times the spectral efficiency of MCS1, the algorithm may let MCS4 be min(MCS2, MCS3). If the spectral efficiency of MCS4 is larger than alpha times the spectral efficiency of MCS1, the UA may be assigned MCS4. Otherwise, the algorithm may assign MCS1 to the UA.

MCS Selection for Delay Sensitive Service

In situations involving some delay sensitive service (e.g., VoIP), spectral efficiency may not be a major concern and delay may need more attention. In such types of traffic, HARQ early termination due to relay nodes may be more beneficial as it reduces the packet transmission delay. Therefore, an MCS level may be chosen as the MCS level that the direct link (eNB-UEUA) can support targeting 10% FER after the first transmission. With the help from the relay node on retransmissions, after the first retransmission, the data may almost certainly be received correctly at the UA. The selected MCS may potentially reduce the VoIP packet transmission delay.

Since VoIP air interface delay budget can accommodate a couple of HARQ retransmissions, in another embodiment involving VoIP packets with large payload sizes, if the UEUA is close to the RN, a higher MCS level or a higher alpha value (e.g., alpha >2) may be selected. This may leverage the relay node's help while at the same time, the VoIP packets transmissions may be terminated within the delay budget. This may be especially useful for VoIP UAs located at the edge of a cell.

According to alternative embodiments of the present disclosure, the MCS estimation for the direct link (eNB-UA) and access link (RN-UA), combined, may be based on the estimated effective SINR of one or multiple transmissions where the transmissions are from the access node and relay node. For instance, the MCS estimation for the combined link may be based on the estimated effective SINR after multiple transmissions where the first transmission is from the access node and the retransmissions are from the access node and relay node. Thus, a more accurate estimated effective SINR may be employed to select the MCS level.

4.3.1 Perfect Backhaul Link

Figure 7:
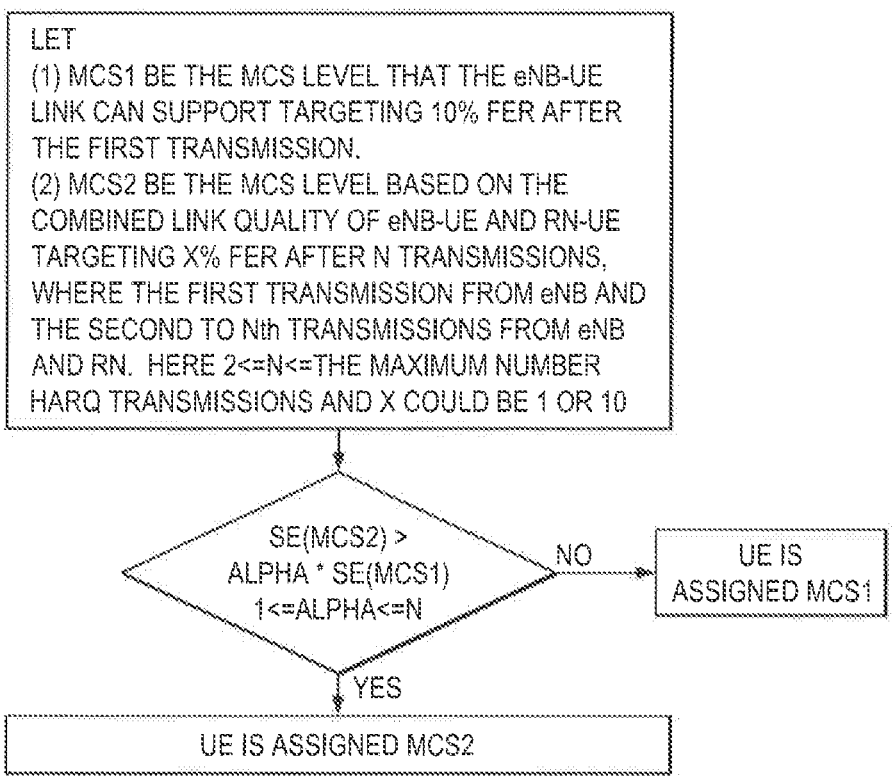

Referring now to FIG. 7, a flow chart is shown illustrating a method according to an embodiment of the present disclosure for selecting a MSC level in a perfect backhaul link. The algorithm depicted in FIG. 7 may use SINR estimates for the direct link (eNB-UA) and access link (RN-UA) at the access node (eNB) to choose an appropriate MCS level if one relay node participates in the coordinated transmission. The algorithm may first assume that MCS1 is the MCS level that the direct link can support targeting 10% FER after the first transmission. The access node may next estimate the effective SINR of chase combining or incremental redundancy combining (depending on the HARQ combining scheme used in the system) with the first transmission from access node and the second to $N^{th}$ transmissions from both access node and relay node. The access node maps this effective SINR to a MCS level targeting X % FER after N transmissions, where 2≤N≤the maximum number HARQ transmissions, and where X may be 1 or 10. The algorithm may denote this MCS level from the combined link of eNB-UA and RN-UA as MCS2. Typically, N=2 may be used.

If the spectral efficiency of MCS2 is larger than alpha times of the spectral efficiency of MCS1, where 1≤alpha≤N, the UA may be assigned MCS2. Otherwise, the UA may be assigned MCS1. Alpha may be adjusted in the outer loop link adaptation, as described below. Further, if multiple relay nodes participating in the coordinated transmissions, this algorithm may still apply with MCS2 being the MCS level from the combined link of eNB-UA and multiple RNs-UA.

Imperfect Backhaul Link

Figure 8:
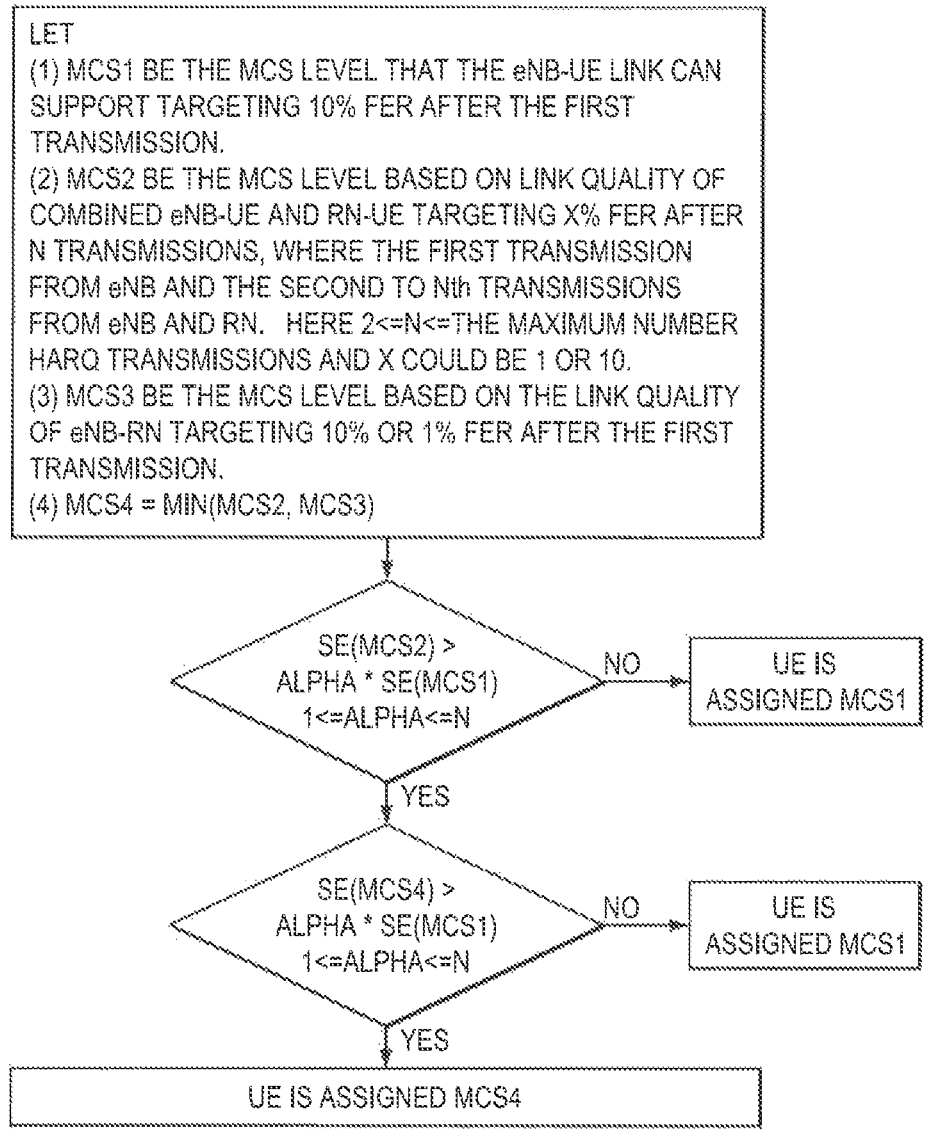

Referring now to FIG. 8, a flow chart is shown depicting an algorithm for selecting an appropriate MCS level if one RN participates in the coordinated transmission. The algorithm may use the SINR estimates for the eNB-UA and RN-UA links at the access node (eNB). First, the algorithm may assume that MCS1 is the MCS level that the eNB-UA link can support targeting 10% FER after the first transmission. The access node may next estimate the effective SINR of chase combining or incremental redundancy combining (depending on the HARQ combining scheme used in the system) with the first transmission from eNB and the second to $N^{th}$ transmissions from both eNB and RN. The eNB maps this effective SINR to a MCS level targeting X % FER after N transmissions, where 2≤N≤the maximum number of HARQ transmissions, and where X may be 1 or 10. The algorithm may denote this MCS level from the combined link of eNB-UA and RN-UA as MCS2. Typically, N=2 may be used. The algorithm may further assume that MCS3 is the MCS level based on the link quality of eNB-RN targeting 10% or 1% FER after the first transmission.

If the spectral efficiency of MCS2 is smaller than alpha times the spectral efficiency of MCS1, where 1 alpha N, the UA may be assigned MCS1. Alpha may be adjusted in the outer loop link adaptation, as described in detail below. If the spectral efficiency of MCS2 is larger than alpha times the spectral efficiency of MCS1, the algorithm may let MCS4 be min(MCS2, MCS3). If the spectral efficiency of MCS4 is larger than alpha times the spectral efficiency of MCS1, the UA may be assigned MCS4. Otherwise, UA may be assigned MCS1. Further, if a UA is assigned to multiple RNs, not all RNs may need to be involved in the coordinated transmissions. In addition, other techniques discussed above may apply in such cases, as well as with VoIP like service.

Link Adaptation—Perfect Backhaul Link

Using the SINR estimates for the eNB-UA and RN-UA links at the eNB, an algorithm according to an embodiment of this disclosure may be employed to choose an appropriate MCS level if one RN participates in the coordinated transmission. First, the algorithm may assume that MCS1 is the MCS level that the eNB-UA link can support targeting 10% FER after the first transmission. The algorithm may next assume that MCS2 is the MCS level based on the quality of the combined link of eNB-UA and RN-UA targeting 10% FER after the first transmission. The UA may be assigned an MCS level which is between MCS1 and MCS2. The MCS level may be selected such that the overall user throughput can be potentially enhanced. This may be an eNB implementation-based determination. If multiple RNs are participating in the coordinated transmissions, the foregoing algorithm may still be applicable with MCS2 being the MCS level from the combined link of eNB-UA and multiple RNs-UA.

Imperfect Backhaul Link

Using the SINR estimates for the eNB-UA and RN-UA links at the eNB, the an algorithm according to the present disclosure may be employed to choose an appropriate MCS level if one RN participates in the coordinated transmission. Specifically, the algorithm may assume that MCS1 is the MCS level that the eNB-UA link can support targeting 10% FER after the first transmission. The algorithm may next assume that MCS2 is the MCS level based on the quality of the combined link of eNB-UA and RN-UA targeting 10% FER after the first transmission. The algorithm may further assume that MCS3 is the MCS level based on the link quality of eNB-RN target 10% or 1% FER after the first transmission.

If min(MCS2,MCS3)<MCS1, the UA may be assigned MCS1. Otherwise, the UA may be assigned an MCS level which could be somewhere between MCS1 and min(MCS2, MCS3). The MCS level may be selected such that the overall user throughput may be potentially enhanced. If a UA is assigned to multiple RNs, not all RNs may need to be involved in the coordinated transmissions. Other techniques discussed above may apply, as well as with VoIP like service.

Outer Loop Link Adaptation

Due to the absence of CRS from RNs and CQI feedback delay in practice, it may hard for the eNB to obtain an accurate knowledge of the RN-UA link quality. As a result, the MCS selection schemes previously discussed may be used to provide an initial MCS selection. The eNB may further apply an outer loop link adaptation to adjust the MCS based on the actual observed FER statistics and HARQ termination statistics.

4.5.1 Perfect Backhaul Link

Figure 9:
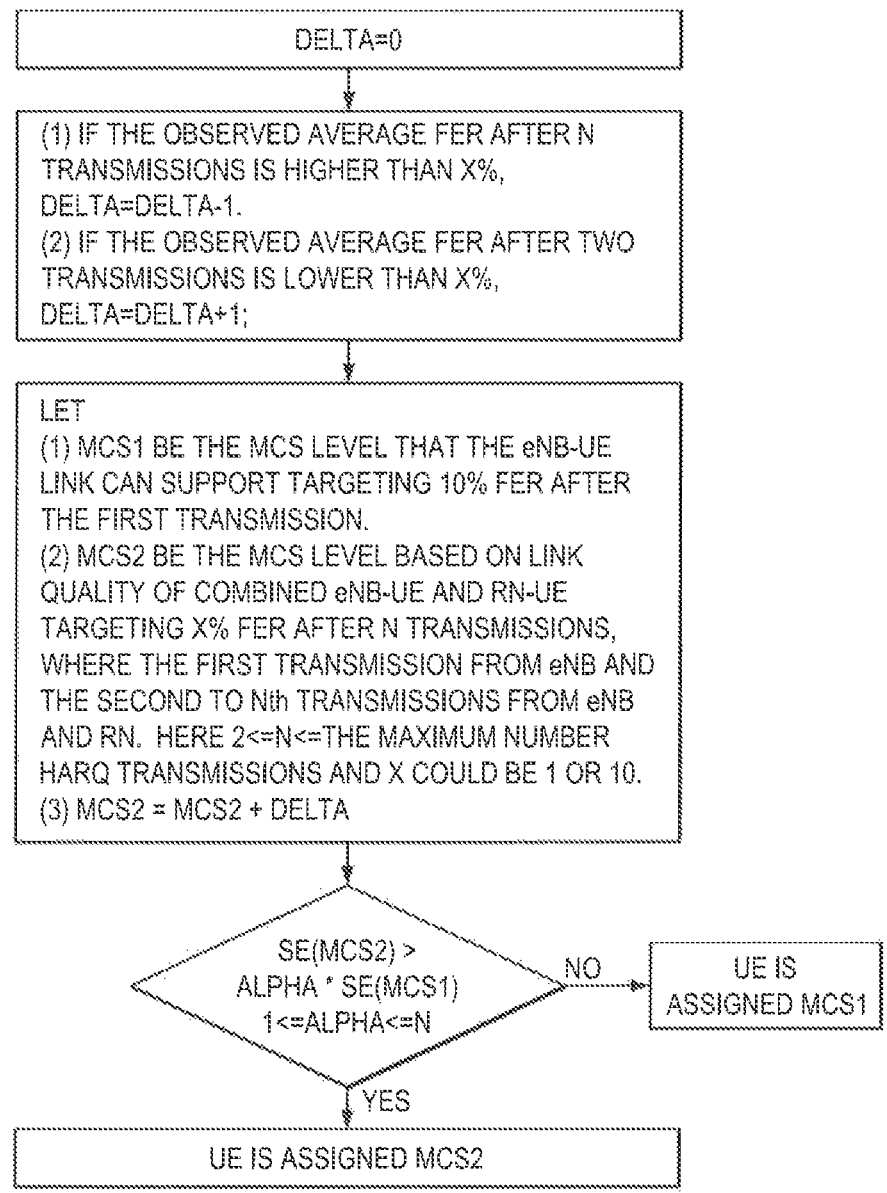

Referring now to FIG. 9, a flow chart is show illustrating an outer link adaption algorithm according to the present disclosure. For each UA, the eNB may collect the long-term averaged FER statistics and HARQ termination statistics for the packets that are assigned higher MCS levels taking account of the RNs. The long-term average can be a window based moving average. The algorithm may assuming that the MCS selection is targeted for X % FER after N transmissions. If the actual observed average FER after N transmissions is higher than X %, the eNB may use a lower MCS. Otherwise, a higher MCS may be used. The eNB may apply the various schemes to adjust the MCS level based on the observed average FER and HARQ statistics.

According to one scheme, the algorithm may denote MCS0 as the MCS level obtained via one or more techniques discussed above. The eNB may adjust the MCS level to MCS0+Delta, where Delta is an integer and is initially set as 0. If the average FER after N transmissions is higher than x %, then Delta=Delta−1. If the average FER after N transmissions is lower than x %, then Delta=Delta+1. According to this technique, the adjustment may be made on MCS directly.

According to an alternative scheme, the algorithm may denote SINR0 as the estimated effective SINR of the combined link of eNB-UA and RN-UA after N transmissions based on the schemes described herein. The eNB may adjust the SINR to SINR0+Delta for MCS mapping, where Delta may be a non-integer number and is initially set as 0. If the average FER after N transmissions is higher than X %, then Delta=Delta−Step. As an example, the value of Step may be 0.5 dB. If the average FER after N transmissions is lower than X %, then Delta=Delta+Step. According to this scheme, the adjustment may be made on the SINR that indirectly affects MCS selection.

In one embodiment, yet another scheme may be employed, which may be combined into either or both of the schemes discussed above. Specifically, if the average FER after N transmissions is higher than X %, then alpha=alpha+0.1. If the average FER after N transmissions is lower than X %, then alpha=alpha−0.1. A similar adaptation scheme may applicable to Y (discussed above) as well. In choosing the MCS level, the eNB may combine the initial MCS selection discussed above and the aforementioned outer loop link adaptation. In FIG. 9, the flow chart depicts the complete algorithm used to select a MCS level, taking the initial MCS selection discussed above as an example (FIG. 9 is a modification of FIG. 7). A similar modification may be applied to one or more of the MCS selection scheme discussed herein.

Imperfect Backhaul Link

Figure 10:
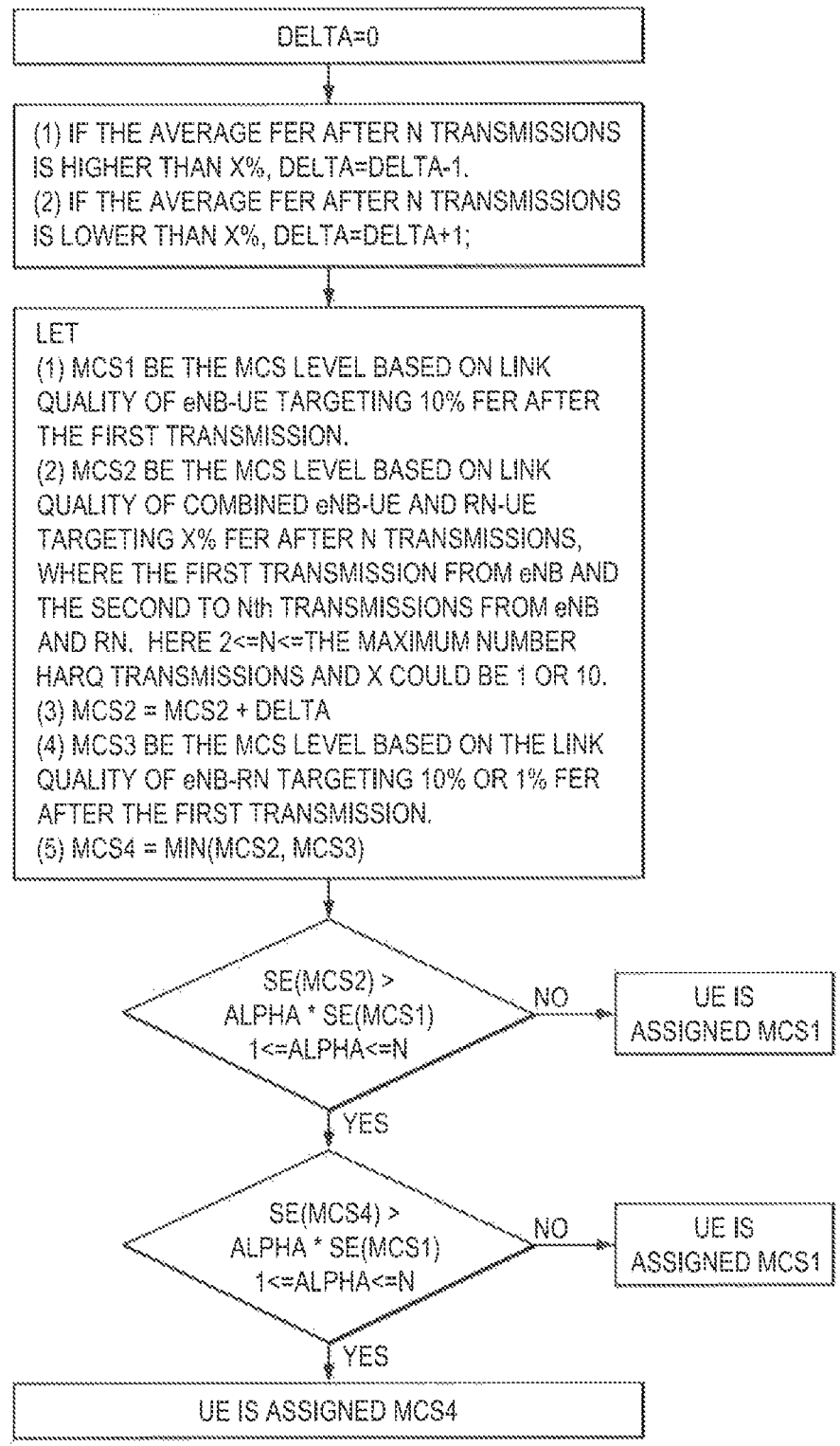

Referring now to FIG. 10, a flow chart is shown depicting an algorithm for selecting a MCS with the outer link adaptation for an imperfect backhaul link. Here, the eNB may collect the long-term averaged FER statistics and HARQ termination statistics for the packets that are assigned the high MCS levels based on the combined link of eNB-UA and RN-UA. The options to adjust MCS levels discussed above may be applied equally for the imperfect backhaul case. In FIG. 10, the complete flow chart of an algorithm is shown to select a MCS level, with the initial MCS selection discussed above as an example (FIG. 10 is a modification FIG. 8). A similar modification may be applied to one or more MCS selection schemes discussed above.

Simulation Assumptions

Referring not to FIG. 11, a table is shown listing simulation parameters. Here, the relay channel models discussed above are used. A network of 57 sectors with the site-to-site distance of 1.732 km are simulated. Each sector has four relay nodes (RN) which are uniformly placed at a distance of ⅔ cell radius from the eNB. The simulation assumes 10 users per sector with 3 km/h mobile speed. The antenna configurations for both eNB-UA and RN-UA links are 1×2 with independent fading at the two receiver branches. Perfect backhaul link is assumed, which implies no packet error on the backhaul link. It is also assumed that one RN is involved in the coordinated transmission. The following parameters from the flow chart in FIG. 7 are used in the simulation: alpha=2, N=2, and X=10. Chasing combining for HARQ is used in the simulation.

In the simulation, a round-robin scheduler with full bandwidth allocation is employed, i.e., the resource blocks of the entire subframe are assigned to one user (e.g., UA or UE). The full-band resource allocation relieves the scheduling constraint brought by the relay nodes. The relay node is usually half-duplex and may not transmit and receive on one frequency at the same time. If a RN is helping one user with retransmission in a subframe, it cannot listen to the other user's initial transmissions from the eNB. This may introduce scheduling constraints for a system with the Type II relays. The full-band allocation avoids this scheduling constraint as only one user is assigned in one subframe.

Simulation Results

Figures 12, 13:
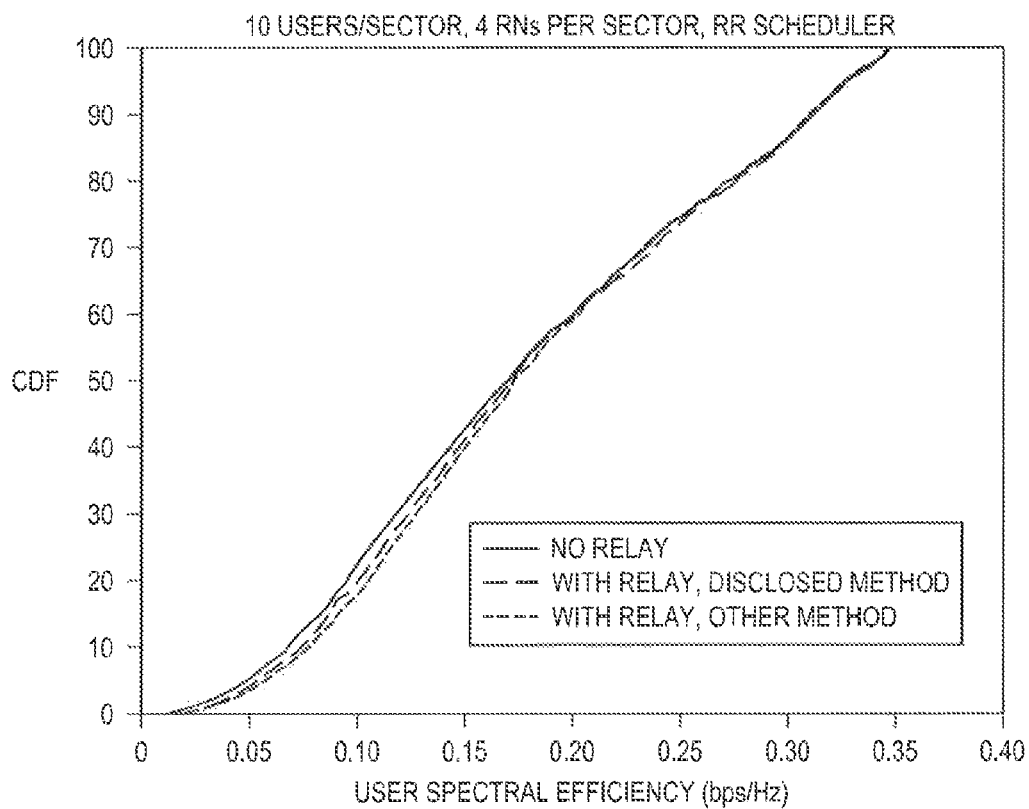
FIG. 12 is a waveform diagram illustrating throughput gains of a relay-augmented system versus an access node network.
FIG. 13 is a table illustrating throughput gains of a relay-augmented system versus an access node network.

In this section, the system performance of the disclosed embodiments are compared to another method that employs techniques that are generally distinct than those of the present disclosure. For a regular eNB network without relay, the link adaptation criterion is 10% FER after the first transmission. FIG. 12 and the table depicted in FIG. 13 show the throughput gains of a relay-augmented system compared to a regular eNB network. For the method disclosed in the present disclosure, with four RNs per sector, a 2.61% gain is observed on the cell throughput and a 15.3% gain on the cell-edge throughput. For the other method, a 1.68% gain on the cell throughput and a 8.0% gain on the cell-edge throughput is observed. Hence, the method of the present disclosure performs better.

The sector throughput gain in Table 2 may be obtained as follows. In each simulation run, 10 users may be randomly dropped in the sector and the sector throughput may be collected. This simulation run may be repeated 200 times, for example, and the average sector throughput can be found from the 200 runs. The percentage gain may be calculated as the sector throughput for a regular eNB network minus the sector throughput for a relay-augmented network divided by the sector throughput of the regular eNB network.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for selecting a modulation and coding scheme for a cell, the method comprising:
   estimating, by an access node, a quality of a link between a relay node in the cell and a user agent in the cell, wherein estimating the quality includes:
   estimating a signal to interference-and-noise ratio (SINR) of a link between the access node and the user agent, and
   scaling the estimated SINR of the link between the access node and the user agent to estimate a SINR of the link between the relay node and the user agent; and using the estimated quality of the link between the relay node and the user agent to select the modulation and coding scheme for the cell.

2. The method of claim 1, wherein estimating the quality of the link between the relay node and the user agent further includes the access node comparing a signal strength received at the relay node with a signal strength received at the access node to estimate a coupling loss difference between the links linking the user agent to the access node and the relay node.

3. The method of claim 2, wherein the access node scales the estimated SINR of the link between the access node and the user agent by at least one of the estimated coupling difference and a transmit power difference between the access node and the relay node.

4. The method of claim 2, wherein the signal strength received at the relay node corresponds to an uplink sounding reference symbol (SRS) transmission.

5. The method of claim 1, wherein if a different number of antennas are employed at the access node and the relay node for transmissions, the access node scales the estimated SINR of the link between the relay node and the user agent based on a difference in antenna diversity gain.

6. The method of claim 1, wherein the access node estimates the SINR of the link between the access node and the user agent based on a reported channel quality indicator (CQI) and via a mapping table of CQI to SINR.

7. An access node of a wireless communications system, the access node comprising:
a transceiver configured to establish a cell that includes a first link between the access node and a relay node in the cell, a second link between the relay node and a user agent in the cell, and a third link between the access node and the user agent; and
a processor configured to:
estimate a quality of the second link by first performing an estimation of a signal to interference-and-noise ratio (SINR) of the third link, and then determining an estimated SINR of the second link by scaling the SINR of the third link; and
use the quality which was estimated to select a modulation and coding scheme for the cell.

8. The access node of claim 7, wherein estimating the quality of the second link between the relay node and the user agent further includes the access node comparing a signal strength received at the relay node with a signal strength received at the access node to estimate a coupling loss difference between the links linking the user agent to the access node and the relay node.

9. The access node of claim 8, wherein the access node scales the estimated SINR of the third link between the access node and the user agent by at least one of the estimated coupling difference and a transmit power difference between the access node and the relay node.

10. The access node of claim 8, wherein the signal strength received at the relay node corresponds to an uplink sounding reference symbol (SRS) transmission.

11. The access node of claim 7, wherein if a different number of antennas are employed at the access node and the relay node for transmissions, the access node scales the estimated SINR of the link between the relay node and the user agent based on a difference in antenna diversity gain.

12. The access node of claim 7, wherein the access node estimates the SINR of the link between the access node and the user agent based on a reported channel quality indicator (CQI) and via a mapping table of CQI to SINR.

13. A non-transitory computer medium storing computer readable instructions executable by a processor to implement a method for selecting a modulation and coding scheme for a cell, the method comprising:
estimating, by an access node, a quality of a link between a relay node in the cell and a user agent in the cell, wherein estimating the quality includes:
estimating a signal to interference-and-noise ratio (SINR) of a link between the access node and the user agent, and
scaling the estimated SINR of the link between the access node and the user agent to estimate a SINR of the link between the relay node and the user agent; and
using the estimated quality of the link between the relay node and the user agent to select the modulation and coding scheme for the cell.

14. The non-transitory computer medium of claim 13, wherein estimating the quality of the link between the relay node and the user agent further includes the access node comparing a signal strength received at the relay node with a signal strength received at the access node to estimate a coupling loss difference between the links linking the user agent to the access node and the relay node.

15. The non-transitory computer medium of claim 14, wherein the access node scales the estimated SINR of the link between the access node and the user agent by at least one of the estimated coupling difference and a transmit power difference between the access node and the relay node.

16. The non-transitory computer medium of claim 14, wherein the signal strength received at the relay node corresponds to an uplink sounding reference symbol (SRS) transmission.

17. The non-transitory computer medium of claim 13, wherein if a different number of antennas are employed at the access node and the relay node for transmissions, the access node scales the estimated SINR of the link between the relay node and the user agent based on a difference in antenna diversity gain.

18. The non-transitory computer medium of claim 13, wherein the access node estimates the SINR of the link between the access node and the user agent based on a reported channel quality indicator (CQI) and via a mapping table of CQI to SINR.

* * * * *